United States Patent

[11] 3,568,149

[72] Inventor Henry C. Sibley
Adams Basin, N.Y.
[21] Appl. No. 767,766
[22] Filed Oct. 15, 1968
[45] Patented Mar. 2, 1971
[73] Assignee General Signal Corporation
Rochester, N.Y.

[54] DIGITAL CODE RECEIVING SYSTEM
9 Claims, 6 Drawing Figs.

[52] U.S. Cl. .................................................. 340/146.1
[51] Int. Cl. .................................................. H03k13/34, H041 1/10, H04q 3/02
[50] Field of Search .......................................... 340/146.1, 347

[56] References Cited
UNITED STATES PATENTS
3,199,077 9/1965 Prather .......................... 340/146.1

*Primary Examiner*—Malcolm A. Morrison
*Assistant Examiner*—R. Stephen Dildine, Jr.
*Attorneys*—Harold S. Wynn and Forest B. Hitchcock

ABSTRACT: A digital code receiving system is provided wherein received bits of a digital code are applied as serial inputs to a shift register, and parallel readout of the shift register is applied to a plurality of decoders, each decoder being adapted to recognize only a single code distinctive of that decoder. For code checking purposes, only codes having the same numbers of mark and space characters are used. Each decoder has first and second outputs delivered successively, the first output checks the proper elements of the code. This output then complements the shift register at an intermediate point in the bit period, and the same decoder delivers a second output if the register is fully complemented. A control device is rendered operable in response to the alternate first and second outputs of its associated decoder.

INVENTOR.
H.C. SIBLEY
BY
HIS AGENT

INVENTOR.
H.C.SIBLEY
BY
HIS AGENT

INVENTOR.
H.C. SIBLEY
BY
Harold S. Wynne
HIS AGENT

DIGITAL CODE RECEIVING SYSTEM

This invention relates to a digital code receiving system and, while it is subject to a wide range of application, it is especially suited for use in the reception of commaless codes and will be particularly described in that connection. It more particularly relates to improvements in checking the integrity of digital code receiving apparatus that can be used for the reception of commaless codes.

Code communication from wayside to vehicles, such as trains, for train control purposes has been commonly provided by alternating current transmission through the track rails which serve as a communication channel. The alternating current is generally continuously time coded to convey information to trains as to track occupancy conditions, i.e., as to track occupancy in advance of the trains. The time coded energy, is received inductively on the trains and is used for train control purposes, such as to limit the speed at which the train may travel in accordance with different conditions of occupancy of the trackway in advance of the train. This communication involves safety and thus the integrity of the code communication apparatus is important. Such a system has many limitations, one of which being that only a single message is communicated at a time, based on the particular rate code selected at the wayside for communication.

The modern system for control of vehicles, particularly rapid transit passenger vehicles, requires more sophisticated control system, and requires the communication of a greater number of selected controls from the wayside to the vehicles and at times to other wayside locations, and to a central office. Thus it is proposed to communicate from the wayside by digital codes that are continuously transmitted. These codes can be transmitted as commaless codes, wherein a single distinctive code is continuously repeated for communication of a single control, or two distinctive codes for different control purposes can be continuously transmitted alternately, thus maintaining two substantially continuous channels of control from the wayside to a receiving station. In a similar manner, other channels of communication can be added as required.

An object of the present invention is to provide an improved digital code receiving system wherein the integrity of code storage and decoding apparatus is fully checked before permitting control of a device in accordance with a received digital code.

Another object of the present invention is to provide an improved digital code receiving system wherein a decoder for a distinctive code delivers a first output for complementing a shift register and a second output in response to the complement of the distinctive code being decoded by the decoder.

Another object of the present invention is to provide an improved digital code receiving system wherein the operation of a device in response to a distinctive code is enabled as a result of delivery of alternate first and second outputs of an associated decoder.

SUMMARY OF THE INVENTION

A digital code receiving system is provided for receiving selected codes having the same numbers of each of two binary characters such as marks (1 characters) and spaces (0 characters) communicated over a communication channel and applied as inputs to a shift register. Decoders are provided for delivering outputs in response to respective distinctive parallel output codes of the shift register. Each of the decoders has first means responsive to parallel outputs of the shift register of a distinctive code for delivering a first decoder output which is used for complementing the register. Each of the decoders also is operable to deliver a second decoder output in response to parallel outputs of the shift register of the complement of the distinctive code belonging to the associated decoder. Control means is provided for enabling operation of a device as a result of delivery of alternate first and second outputs of an associated decoder.

Each of the decoders has a plurality of gates having their inputs controlled by the parallel outputs of the shift register, some of the gates being effective to deliver outputs upon detection of the distinctive code in the shift register belonging to that decoder, and others of the gates being effective to deliver outputs upon detection of the complement of such distinctive code.

The first and second outputs of the decoder are delivered during a single bit period in that the shift register is complemented at an intermediate point in the bit period and, in response to the register being complemented, the decoder delivers the second output which enables operation of a device in response to the distinctive code being decoded. Such operation is provided by timing means which normally generates a shift pulse to shift the register at an intermediate point in the reception of each bit, and is effective jointly with a first output of a decoder to complement the shift register just prior to the normal shift period during a bit as is illustrated in FIG. 2, so as to provide for the decoding of the complement of the code being received as a means for generating a second output from the decoder. The reason for complementing the code is to check the gates to insure that they are not responsive to more or less than the proper number of marks.

For a better understanding of the present invention, together with further objects thereof, reference is had to the following description, taken in connection with the accompanying drawings, while its scope will be pointed out in the appending claims.

FIGS. 1A and 1B when placed one above the other, illustrate schematically a digital code receiving system according to one embodiment of the present invention.

Figure 1A:
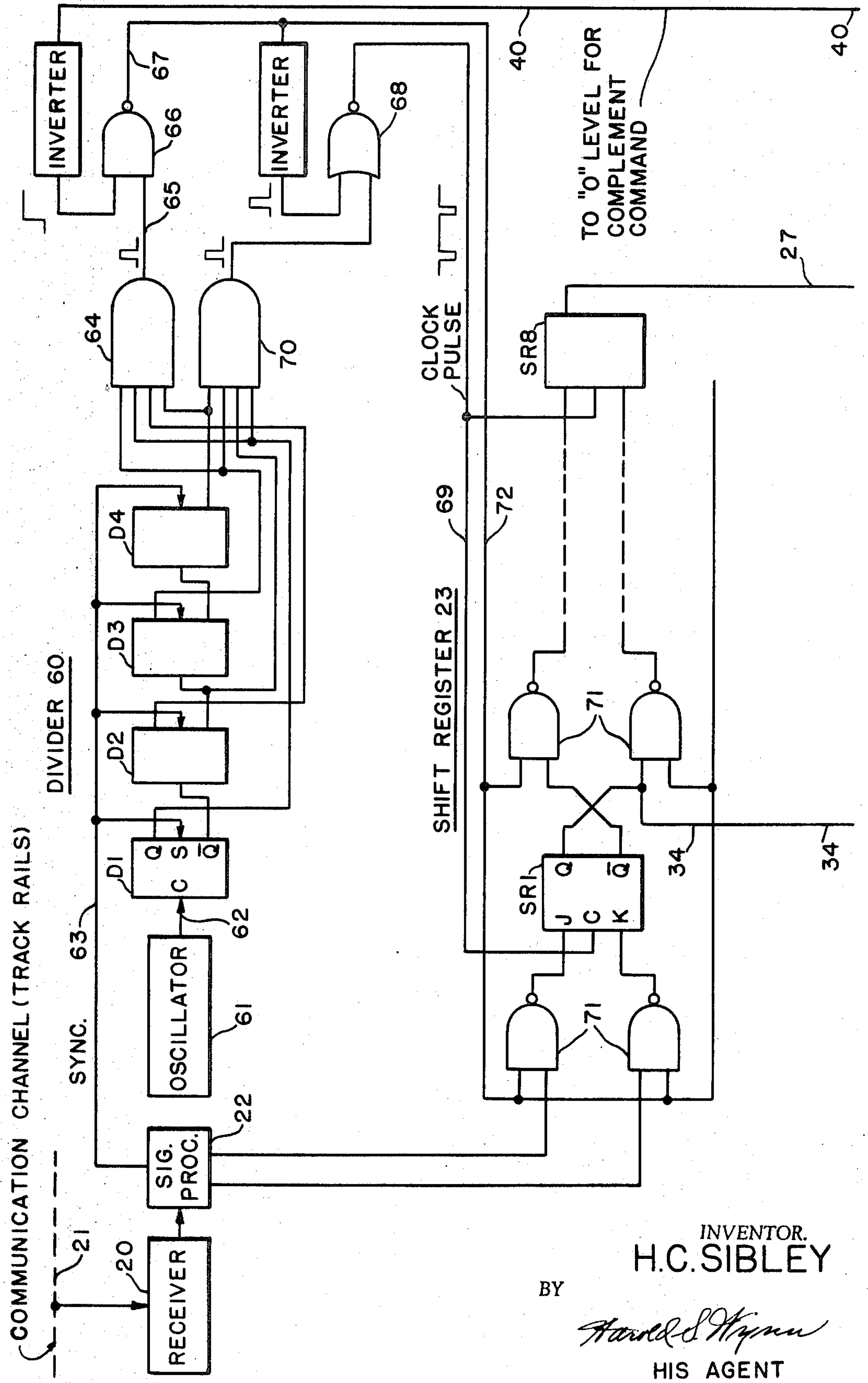
Figures 1B, 2:
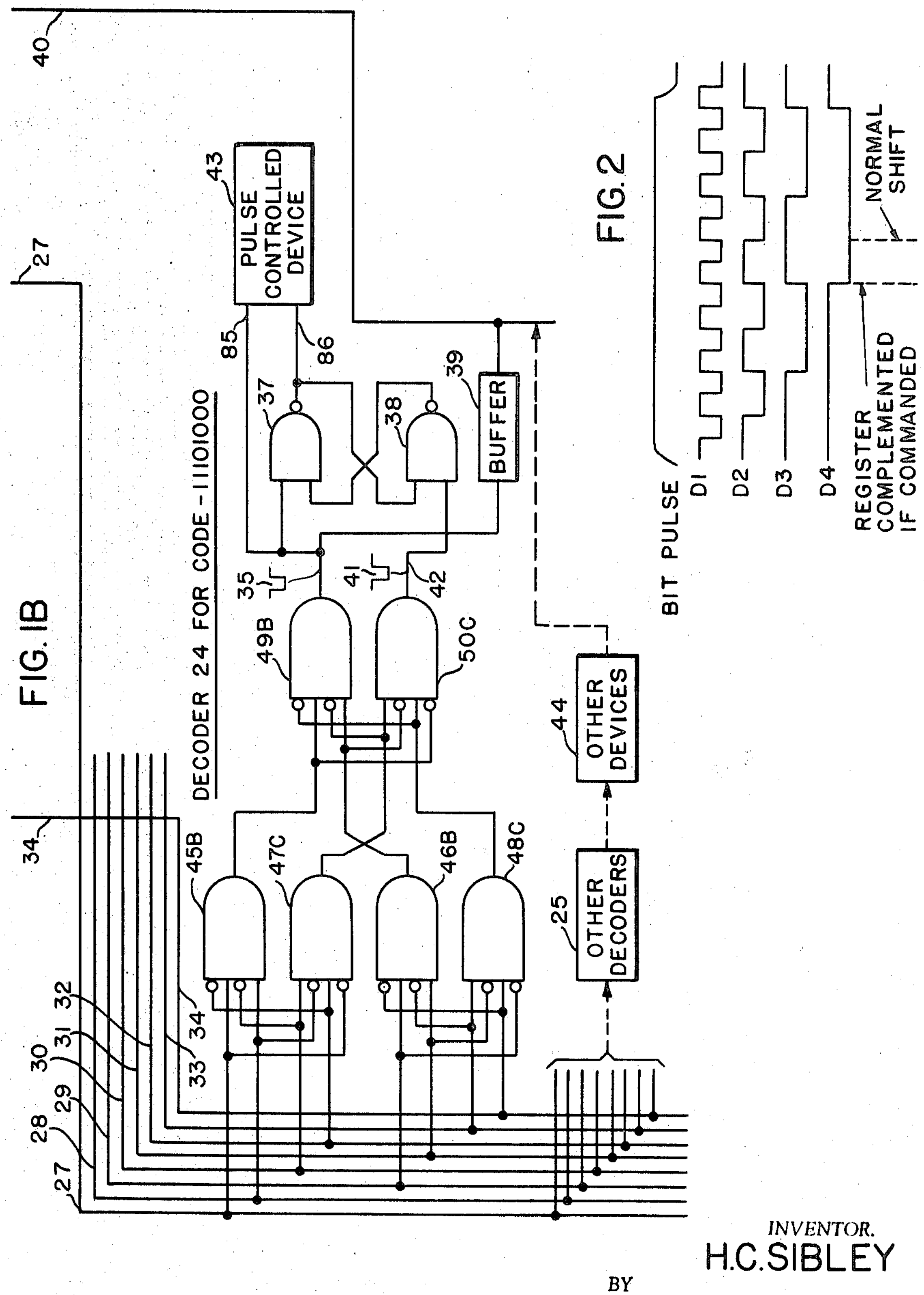
FIG. 2 is a series of sequence diagrams illustrating the mode of operation of timing means that is provided for governing the complementing and the shifting of the shift register during a bit period.

With reference to FIGS. 1A and 1B, a digital code receiving system is illustrated wherein a receiver (see FIG. 1A) receives code pulses communicated over a communication channel 21, which can be the track rails of a stretch of railway track. It is preferable that the codes used for communication have been selected to have the same number of each of two binary characters such as marks and spaces. There are further qualifications in the selection of codes for use with the system according to the present invention that will be considered more in detail as the description of the invention progresses. The codes received have their characters processed by a conventional signal processor 22, for shaping the pulses and the output of the signal processor 22 is applied as serial input to a suitable shift register 23.

A typical decoder 24 (see FIG. 1B), and other decoders 25 are provided for delivering outputs in response to respective distinctive parallel output codes of the shift register 23 that are applied to wires 27 through 34 which are output wires of the stages of the shift register 23. The typical decoder 24 is for the code 11101000. The decoder 24 delivers a first output pulse 35 in response to the detection of the presence of a mark as bits 1, 2, 3 and 5 and in accordance with the detection that the other bits are space characters. The pulse 35 is effective to shift a flip-flop circuit comprising NAND gates 37 and 38 and to provide an output, through a buffer 39, over wire 40, which causes the shift register 23 to be complemented.

After the shift register 23 is complemented in response to the generation by the decoder 24 of the output pulse 35, the decoder 24 becomes responsive to the complementary code set up in the shift register 23 to provide a second output pulse 41 on wire 42.

A pulse controlled device 43 is controlled in response jointly to the alternate application as its input of the first and second output pulses 35 and 41 of the decoder 24. Other pulse controlled devices 44 are provided in a similar manner in association with the several other decoders 25.

To consider the structure of the typical decoder 24 more specifically, with reverence to FIG. 1B, the decoder 24 has a plurality of AND gates 45B, 46B, 47C, and 48C which have their inputs controlled by the parallel code output of the shift register 23. The gates 45B and 46B detect that there are mark character outputs on wires leading to respective stages of the shift register 23 corresponding to marks in the distinctive code for which the decoder 24 is provided. These gates further detect that there are not any other marks appearing in the code. Gates 47C and 48C perform a similar function with respect to detecting the complementary code of the shift register 23. Gate 49B is provided for detecting when there is output simultaneously of gates 45B and 46B to indicate that the distinctive 8-bit code for decoder 24 is detected. This gate also checks that there is no input from the complementary gates 47C and 48C. Thus the output pulse 35 of gate 49B is provided only in response to the detection of the distinctive 8-bit code 11101000, for which decoder 24 is provided. In a similar manner, a gate 50C is provided for checking that the complement of the distinctive 8-bit code 11101000, assigned to decoder 24, is delivered to the decoder by the shift register 23 when the shift register 23 is complemented. Thus the gate 50C delivers an output pulse 41 only when there is output of the gates 47C and 48C and no output of the gates 45B and 46B.

The first and second outputs of the decoder 24 apply pulses 35 and 41 alternately to the flip-flop circuit comprising gates 37 and 38 to alternately set and reset this flip-flop circuit.

Timing means in the form of a divider 60 and an oscillator 61 (see FIG. 1A) is provided for governing the shifting of the shift register 23 at an intermediate point in each bit interval and for governing the complementing of the shift register 23. Oscillator 61 is continuously operating to provide a basic frequency for the control of the divider 60, and the deliver 60 is driven in accordance with output of the oscillator 61 over wire 62. The divider 60 is illustrated as having four conventional integrated circuit stages, D1, D2, D3 and D4.

Upon reception of each pulse of a code over the communication channel 21, the signal processor 22 generates a synchronization pulse for application over wire 63 to reset all of the divider stages D1, D2, D3 and D4 at the same time so as to provide a desired time for initiation of the timing divider 60 in synchronism with the beginning of a bit being received. FIG. 2 illustrates output of the respective stages of the divider 60 during the reception of a single bit pulse. The final stage D4 of the divider 60 becomes set at approximately the midpoint in the reception of a bit, and this turns on an AND gate 64, which delivers an output over wire 65 to a NAND gate 66. Gate 66 requires energy on both wire 65 and the complement command bus 40 in order to provide an output on wire 67. Such output is effective through OR gate 68 to generate a negative going pulse on clock pulse bus 69 to complement the shift register. The negative going pulse is also applied over wire 67 at this time to inhibit bus 72 to prevent the shifting of the shift register 23 at the time when it is being complemented. As soon as the shift register 23 is complemented, an output is delivered by the appropriate decoder corresponding to the code that is complemented to provide a second output pulse for control of an associated pulse controlled device. Thus, for example, in response to the complement of the code for decoder 24 (see FIG. 1B), AND gates 47C and 48C deliver outputs which cause the gate 50C to deliver an output pulse 41 for resetting the flip-flop circuit having NAND gates 37 and 38. When the divider stage D2 (see FIGS. 1A and 2) next becomes turned off, an output of the divider 60 is provided through AND gate 70 and OR gate 68 to provide a clock pulse on bus 69 for shifting the shift register 23 at a time indicated in FIG. 2.

The shift register 23 (see FIG. 1A) is illustrated as having respective integrated circuit stages of which the first and last stages SR1 and SR8 are illustrated. The operation of these stages in a shift register are well known, and thus it is considered unnecessary to describe in detail the conventional mode of operation of the shift register 23. In order to be able to inhibit the shifting of the shift register 23 at the time when the shift register is to be complemented, NAND gates 71 are provided between stages which require energization on the shift inhibit bus 72 in order to shift the register 23. This bus is normally energized to enable shifting of register 23 by an output on wire 67 from the NAND gate 66. In response to a command from a decoder to complement the shift register 23, and at a time selected by the divider, gate 66 delivers a negative going pulse which disables the gates 71 while the register is being complemented to prevent shifting at that time. Thus, the gates 71 permit shifting during each bit, but prevent shifting at the time the shift register 23 is complemented.

Having thus described the general organization of the system, further description will be set forth when considering the mode of operation of the system.

Although it will be readily apparent that the system as described can be used for decoding code messages, in various types of code communication systems, for a preferred embodiment of the present invention, the digital code receiving system of this invention will be assumed to be applied to the reception of commaless codes, having the same numbers of marks and spaces, which are repeatedly transmitted. To use commaless codes for the purposes intended according to the present invention, codes should be chosen such that no combination of bits of one code with bits of an adjoining received code will produce a valid code that will be recognized by a decoder. Because of the selection of codes in this manner, it is only necessary for the decoders of the receiving apparatus to look for distinctive codes to which the several decoders are assigned, and these distinctive codes will be responded to by the several decoders only provided all of the bits of the particular valid distinctive code involved are in the shift register 23.

Because of the use of the complementary codes, the codes should be chosen so that the bits of a complementary code will not combine with characters of the next adjoining code in the shift register 23 to form a code combination to which any of the decoding apparatus can improperly respond. Such improper combination could of course be prevented by clearing the shift register immediately after the complementary code is used. However, it is not necessary to clear the register of the complementary codes if the codes are so chosen that there will be no valid code formed by a combination in the shift register 23 of the bits of any two codes. It has therefore been assumed for this embodiment of the present invention that the codes to be used will be so chosen and that the complementary code will be moved out of the shift register bit by bit as new code elements are received, and no decoder will respond to combinations of bits of the two codes.

If there are two controls to be simultaneously communicated from the wayside to the receiving apparatus, the codes belonging to the respective controls can be communicated alternately, and the decoding apparatus distinctively responsive to the two codes is made to maintain its control relay energized during the interval when the other code is being communicated.

Figure 3:
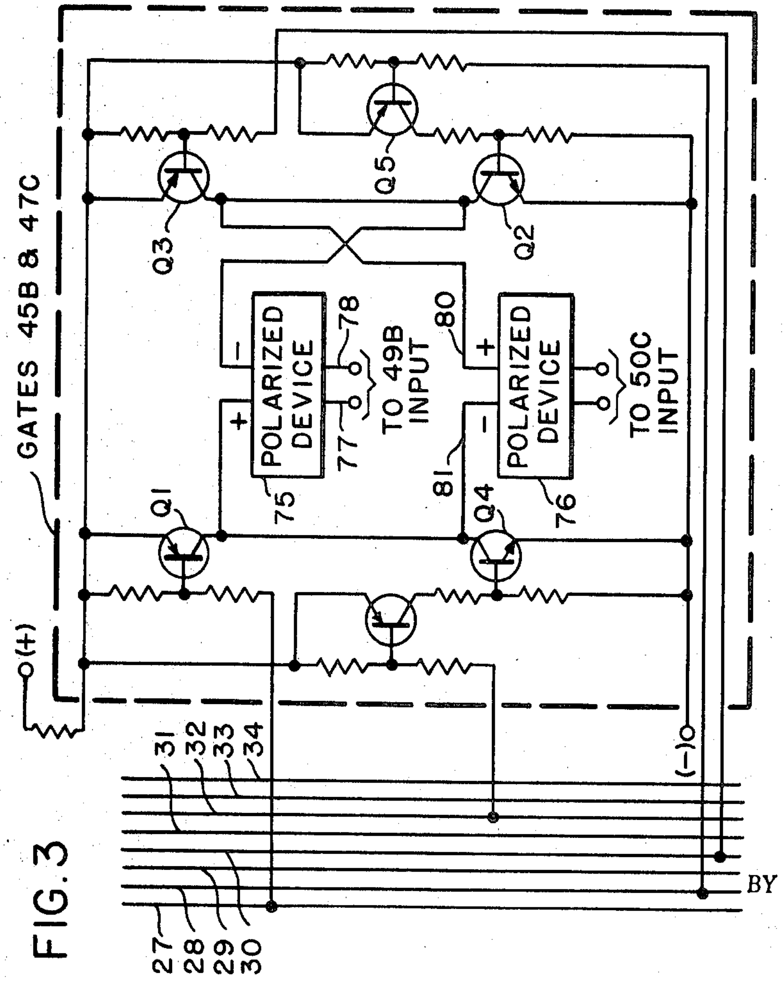
FIG. 3 illustrates the circuit organization for a pair of gates of a typical decoder.

Having heretofore considered the mode of operation of the decoder with reference to FIG. 1B, further consideration will now be given as to detail circuit organization that can be employed in the respective gates of the decoder. With reference to FIG. 3, the detail circuits are shown for gates 45B and 47C of FIG. 2, and it will be readily apparent that these circuits are typical of the circuits that can be provided for the gates 46B, 48C, 49B, and 50C. The circuits of all of these gates are so organized that the failure of a transistor in the gates, either by becoming open circuited of by becoming short circuited will prevent an output from the associated decoder, and thus prevent the possibility of an output from the decoder in response to any code other than the distinctive code to which the decoder is intended to be responsive. This integrity check is facilitated by the complementing of the shift register 23.

For the code assigned to the decoder 24, this decoder delivers an output only in response to the output of a 1 on wires 27, 28, 29 and 31 and a 0 on each of wires 30, 32, 33, and 34. The gate 45B requires that a 1 be present on wires 27 and 28 at a time when there is a 0 on wires 30 and 32.

The above-described mode of operation can be provided by a circuit organization for the gates of the decoder 24 as is typically shown in detail in FIG. 3, for the gates 45B and 47C. Transistors Q1 and Q2 of FIG 3 are used in gate 45B to control the energization of a polarized device 75 in gate 45B, and the transistors Q3 and Q4 are used in energization of a polarized device 76 in gate 47C. Transistors Q5 and Q6 are inverters used in providing control for transistors Q2 and Q4 respectively. If no inputs are being applied to the gates 45B and 47C from the shift register 23 corresponding to mark characters, the transistors Q1 through Q6 are all in their turned off conditions. These transistors can be turned on only in response to a mark output from the shift register 23. In response to gate 45B sensing a mark on wires 27 and 28, transistors Q1, Q5 and Q2 become turned on. The transistor Q5 is an inverter for turning on transistor Q2. With transistors Q1 and Q2 turned on, the polarized device 75 is energized with its proper polarity to provide an output to gate 49B on wires 77 and 78. No output of the device 75 would be delivered if either of the transistors Q3 and Q4 were tuned on, because the turning on or shorting of either of these transistors would prevent application of energy to the polarized device 75.

Similarly, when the shift register 23 is complemented in response to the detection of a code by decoder 24, the transistors Q3 and Q4 become turned on to energize the polarized device 76, and to provide an output to the gate 50C. This requires a mark output on wires 30 and 32, and no mark output on wires 27 and 28. As has been heretofore pointed out, a mark occurring on either of wires 27 or 28 would turn on its associated transistor Q1 or Q2, and the turning on of either of these transistors at the time when the decoder 24 is decoding a complementary code would prevent the energization of the polarized device 76, and thus prevent an output to gate 50C. It will also be readily apparent that the shorting of a transistor Q1 or Q2 would be detected in a similar manner in that there would be no output of the polarized device 76.

It is to be understood that circuits are provided similar to those shown and described relative to FIG. 3 for the gates 46B and 48C. It is also to be understood that the circuit organization for the gates 49B and 50C is similar to that illustrated in FIG. 3 for the gates 45B and 47C. It will be readily apparent that output transistors of the polarized devices for the gates 45B, 46B, 47C and 48C can be used as input transistors in the gates 49B and 50C in a bridge type configuration corresponding to the transistors Q1 through Q4 of FIG. 3. When the gates 49B and 50C are so organized, they can be conveniently called phantom gates in that they use the apparatus common with prior gates 45B, 46B, 47C and 48C.

Figure 4:
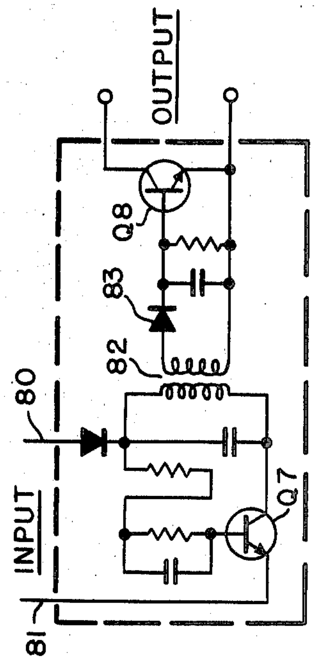
FIG. 4 illustrates circuits of a polarized device that can be used in the circuit organization of FIG. 3.

With reference to FIG. 4, detail circuits are shown for a polarized device 76 which corresponds to the device 76 of FIG. 3 having positive and negative input wires 80 and 81 respectively. This polarized device has an oscillator including transistor Q7 that is operable in response to positive and negative energization of the input wires, and the generated frequency is applied through a transformer 82 and diode 83 to the base of an output transistor Q8. Thus the output transistor Q8 is turned on only provided that energy of a particular polarity is applied to the input wires 80 and 81 to activate the oscillator and provide an alternating current in the secondary winding of transformer 82. A diode is included in series in the input circuit as a threshold device to insure that the oscillator could not be operated in response to an abnormally low level input. The alternating current in the secondary winding of transformer 82 is applied through diode 83 to the base of transistor Q8 to turn this transistor on and thus provide an output of the polarized device 76 that can be used by the gate 50C. It will be noted that this polarized device 76 is fail-safe in that it can produce an alternating current output only in response to energization with the proper polarity of input wires 80 and 81. If the oscillator fails to function or the transistor Q7 is shorted, there is no voltage induced in the secondary winding of transformer 82, and thus there can be no output of the polarized device 76. Even if the polarized device 76 should respond to the wrong polarity, the nature of the gate circuits is such that there would be no invalid output of the decoder.

Figure 5:
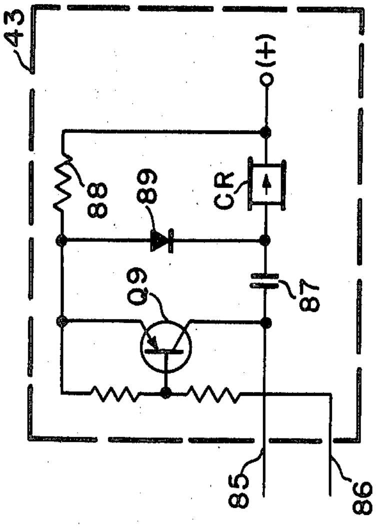
FIG. 5 illustrates circuits for a pulse controlled device that can be operated by output of a decoder.

A typical circuit of a pulse controlled device that is operable in accordance with output of a decoder is illustrated in FIG. 5. The pulse controlled device 43 of FIG. 5 corresponds to the pulse controlled device 43 of FIG. 5 corresponds to the pulse controlled device 43 of FIG. 1B, having input from decoder 24 on wires 85 and 86.

The pulse controlled device 43 has a polarized code responsive relay CR which is energized by the discharge circuit of a capacitor 87 through a switching transistor Q9. The transistor Q9 is normally turned on in accordance with the condition of the flip-flop circuit comprising the gates 37 and 38 of FIG. 1B wherein the gate 37 is normally turned on when the flip-flop circuit is in a reset condition. At this time, the transistor Q9 is turned on because of energization of the voltage divider circuit connected to its base through wire 86. With the transistor Q9 turned on, relay CR is energized with the proper polarity to be maintained in an actuated position by discharge of capacitor 87 through the winding of relay CR resistor 88 and transistor Q9.

With reference to FIG. 1B, when an output pulse 35 is generated in the gate 49B the flip-flop circuit comprising the gates 37 and 38 is set wherein the gate 37 becomes turned off and the gate 38 turned on. This removes energization from the voltage divider circuit for transistor Q9 (see FIG. 5) and causes transistor Q9 to be turned off. Also the output pulse 35 of gate 49B is effective over wire 85 to close a charging circuit for capacitor 87 extending from plus through resistor 88, diode 89, capacitor 87 to a source of negative energy at the output of gate 49C. This charging continues until the timing means of FIG. 1A reaches a point in the cycle as is illustrated in FIG. 2 wherein the shift register 23 becomes complemented. In response to the complementary code setup in the shift register 23, an output pulse 41 (see FIG. 1B) is generated by the gate 50C, and such pulse is applied to the NAND circuit 38 of the flip-flop so as to turn off gate 38 and turn on gate 37. The turning on of gate 37 is effective to apply energy on wire 86 to turn on transistor Q9, and thus reestablish a discharge circuit for the capacitor 87 which has been described, including the winding of the polarized relay CR. Thus as long as the code received by the decoder 24 is frequently repeated, the relay CR is maintained in its picked up position by the intermittent charge and discharge of the capacitor 87. Relay CR is preferably a polarized relay to protect against its being picked up in case the capacitor 87 should become shorted. Under these conditions the polarized relay CR would be driven down by current flow through its winding in the reverse directions. If transistors should be turned on to render charging and discharging circuits effective at the same time, the relay CR will not be picked up.

From the description of the referred embodiment of the invention as it has been set forth, it should be readily apparent that the system can be operable to receive a number of codes alternately by use of decoder 24 and the other decoders 25 so as to maintain energized contemporaneously pulse controlled devices such as the code relay CR associated with decoder 24 in response to respective codes received over the communication channel 21 that are assigned to the several decoders.

While there has been described what is as present considered to be the preferred embodiment of the invention, it will be obvious to those skilled in the art that various changes and modifications may be made therein, without departing from the invention, and it is, therefore, aimed in the appending claims to cover all such changes and modifications as fall within the true spirit and scope of the invention.

We claim:

1. A digital code receiving system for receiving selected codes having the same numbers of each of two binary characters communicated over a communication channel and applied as inputs to a shift register wherein the improvement comprises:

a. decoders for delivering outputs in response to respective distinctive parallel output codes of the shift register;

1. each of the decoders having first means responsive to parallel outputs of the shift register of a distinctive code for delivering a first decoder output for complementing the shift register;

2. each of the decoders having second means responsive to parallel outputs of the shift register of the complement of the distinctive code for delivering a second output; and b. control means comprising devices associated with the several decoders operated in response jointly to the first and second outputs of the associated decoder.

2. The invention according to claim 1 wherein each of the decoders comprises a first plurality of gates having their inputs controlled by the parallel outputs of the shift register, some of the gates being effective to deliver outputs upon detection of said distinctive code in the register and others of the gates being effective to deliver outputs upon detection of the complement of said distinctive code.

3. The invention according to claim 2 wherein each of the gates is a four input AND gate delivering an output only provided that inputs from two stages of the shift register are of a particular character and inputs from two other stages of the shift register are not of said particular character.

4. The invention according to claim 3 wherein each of the decoders comprises a second plurality of gates having their inputs controlled by outputs of the first plurality of gates and effective to deliver output pulses alternately at times when the distinctive code is detected by the first plurality of gates and when the complement of the distinctive code is detected by the first plurality of gates.

5. The invention according to claim 4 wherein each of the gates of the second plurality of gates is a four input AND gate delivering an output only when two of its inputs are from respective ones of said first plurality of gates and are of a particular character, and inputs from two other ones of said first plurality of gates are not of said particular character.

6. The invention according to claim 1 wherein the first and second outputs of the decoder are produced alternately and means is provided for maintaining the device in an actuated condition only so long as the alternate outputs are repeatedly produced by the associated decoder.

7. The invention according to claim 6 wherein the device is a relay and means is provided for alternately charging and discharging a capacitor in response to the alternate outputs of the decoder, the relay being energized by the discharging of the capacitor.

8. A system for receiving selected code bits communicated sequentially over a communication channel and applied as successive bits to a shift register wherein the improvement comprises:

a. decoding means having its input governed by parallel output from respective stages of the shift register and operable to deliver a first output when a particular distinctive code is applied to the input of the decoding means;

b. timing means for normally shifting the register at an intermediate point in the reception of each bit;

c. control means governed jointly by the first output of the decoder and by the timing means for complementing the shift register at an intermediate point in the reception of a bit prior to the normal shifting of the register during that bit;

d. said decoding means being effective to generate a second output when the register is complemented; and e. means for governing a device in response to alternate first and second outputs of the decoder.

9. The invention according to claim 8 wherein the timing means comprises an oscillator and a frequency divider for determining the intermediate point in the reception of a code bit for complementing the register.